United States Patent
Ogawa

(10) Patent No.: US 8,908,777 B2
(45) Date of Patent: Dec. 9, 2014

(54) MEMORY REQUEST ORDERING FOR A MOTION COMPENSATION PROCESS, IMPLEMENTED BY A PICTURE PROCESSING APPARATUS, A PICTURE PROCESSING METHOD, AND A PICTURE PROCESSING PROGRAM

(75) Inventor: Kazuya Ogawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1150 days.

(21) Appl. No.: 12/591,866

(22) Filed: Dec. 3, 2009

(65) Prior Publication Data

US 2010/0158123 A1 Jun. 24, 2010

(30) Foreign Application Priority Data

Dec. 24, 2008 (JP) ................................. 2008-328066

(51) Int. Cl.
| | | |
|---|---|---|
| H04N 7/26 | (2006.01) | |
| H04N 7/24 | (2011.01) | |
| H04N 19/43 | (2014.01) | |
| H04N 19/44 | (2014.01) | |
| H04N 19/433 | (2014.01) | |
| H04N 19/61 | (2014.01) | |
| H04N 9/804 | (2006.01) | |

(52) U.S. Cl.
CPC ... *H04N 19/00509* (2013.01); *H04N 19/00533* (2013.01); *H04N 9/8042* (2013.01); *H04N 19/00515* (2013.01); *H04N 19/00781* (2013.01)
USPC .................................. 375/240.29; 375/240.24

(58) Field of Classification Search
CPC .................... H04N 19/00484; H04N 19/0049; H04N 19/00509; H04N 19/00515
USPC .................................................... 375/240.25
See application file for complete search history.

(56) References Cited

U.S. PATENT DOCUMENTS 5,574,876 A * 11/1996 Uchiyama et al. ................ 711/5
5,912,676 A * 6/1999 Malladi et al. ................ 345/531

(Continued)

FOREIGN PATENT DOCUMENTS

JP 10-228417 A 8/1998
JP 2003-186740 A 7/2003

OTHER PUBLICATIONS

T.H. & C.T. Chiu, "Low Power Design of High Performance Memory Access Architecture for HDTV Decoder", 2007 IEEE Int'l Conf. on Multimedia & Expo 699-702 (Jul. 2007).*

H. Gao, F. Qiao, H. Yang, & H. Wang, "Memory Reduction Techniques for HDTV Video Decoders", 2 Recent Patents on Elec. Engineering 215-225 (Jul. 2009).*

(Continued)

*Primary Examiner* — Dave Czekaj
(74) *Attorney, Agent, or Firm* — Rader, Fishman & Grauer PLLC

(57) ABSTRACT

A picture processing apparatus is disclosed which includes: a memory; and a decoding circuit configured to decode encoded picture data; wherein the memory holds first and second fields of the decoded picture in different areas while holding field planes of a plurality of reference planes in different areas; the decoding circuit includes a motion compensation circuit configured to effect motion-compensating prediction by dividing into a plurality of divisions each of macro blocks making up the picture data in order to perform motion compensation in accordance with the motion-compensating prediction; and, upon transferring the decoded picture held in the memory during a motion compensation process, the compensation circuit rearranges transfer requests to at least either the same reference plane or the same field plane within a divided macro block on the basis of macro block division information and reference picture information, before transferring the rearranged transfer requests consecutively to the memory.

20 Claims, 10 Drawing Sheets

(56) References Cited

U.S. PATENT DOCUMENTS

| | | | |
|---|---|---|---|
| 6,104,751 A * | 8/2000 | Artieri | 375/240.14 |
| 6,214,822 B1 * | 4/2001 | Treiber et al. | 514/218 |
| 6,266,104 B1 * | 7/2001 | Kim | 348/714 |
| 6,272,600 B1 * | 8/2001 | Talbot et al. | 711/140 |
| 6,301,299 B1 * | 10/2001 | Sita et al. | 375/240.01 |
| 6,785,337 B2 * | 8/2004 | Okawahara et al. | 375/240.26 |
| 7,904,641 B2 * | 3/2011 | Uchiyama et al. | 711/105 |
| 8,234,441 B2 * | 7/2012 | Uchiyama et al. | 711/105 |
| 2002/0135589 A1 * | 9/2002 | Jaspers | 345/568 |
| 2005/0099869 A1 * | 5/2005 | Crinon et al. | 365/222 |
| 2005/0195902 A1 * | 9/2005 | Chung | 375/240.25 |
| 2007/0071099 A1 * | 3/2007 | Lee et al. | 375/240.12 |
| 2007/0165039 A1 * | 7/2007 | Seong et al. | 345/536 |
| 2007/0237231 A1 * | 10/2007 | Sriram et al. | 375/240.13 |
| 2008/0159405 A1 * | 7/2008 | Tu | 375/240.24 |
| 2008/0229004 A1 * | 9/2008 | Uchiyama et al. | 711/103 |
| 2008/0285652 A1 * | 11/2008 | Oxman et al. | 375/240.16 |

OTHER PUBLICATIONS

R. Wang, M. Li, J. Li, & Y. Zhang, High Throughput and Low Memory Access Sub-pixel Interpolation Architecture for H.264/AVC HDTV Decoder, 51 IEEE Trans. on Consumer Electronics 1006-1013 (Aug. 2005).*

C.H. Li, C.H. Chang, W.H. Peng, W. Hwang & T. Chiang, "Design of Memory Sub-System in H.264/AVC Decoder", presented at Int'l Conf. on Consumer Electronics (Jan. 2007).*

T.C. Chen, S.Y. Chien, Y.W. Huang, C.H. Tsai, C.Y. Chen, T.W. Chen, & L.G. Chen, "Analysis and Architecture Design of an HDTV720p 30 Frames/s H.264/AVC Encoder", 16 IEEE Trans. on Circuits & Sys. for Video Tech. 673-688 (Jun. 2006).*

F. Lönn, "How to calculate raw uncompressed video sizes", http://www.fastvideoindexer.com/articles/VideoSizes/VideoSize.htm (2008).*

* cited by examiner

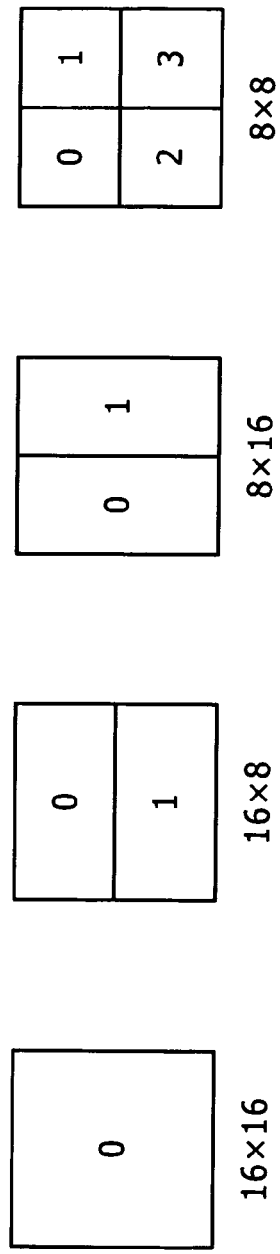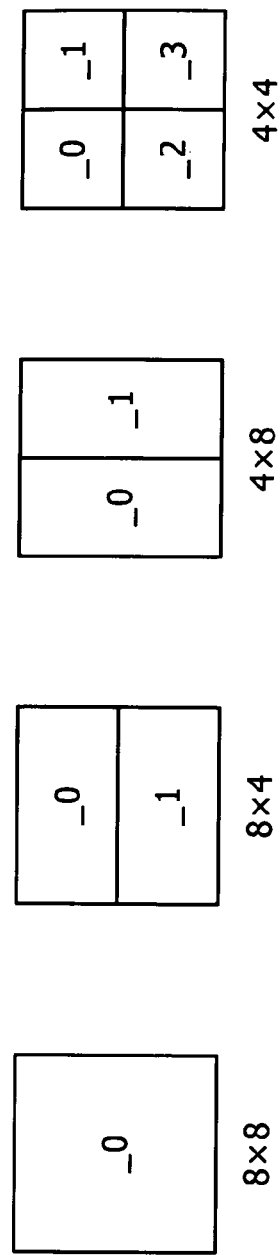

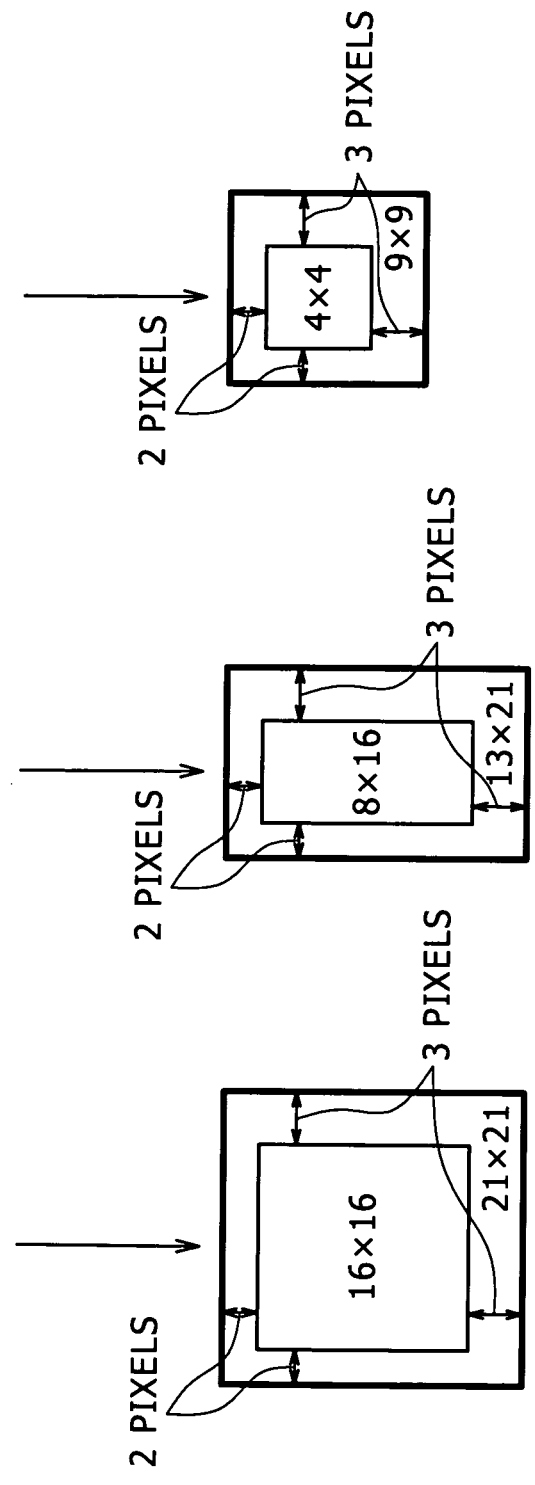

FIG.4

| | 1_0 | 1_1 |
|---|---|---|
| 0_0 | 1_2 | 1_3 |
| 2_0 | 2_1 | 3_0 |
| | | 3_1 |

FIG. 8A

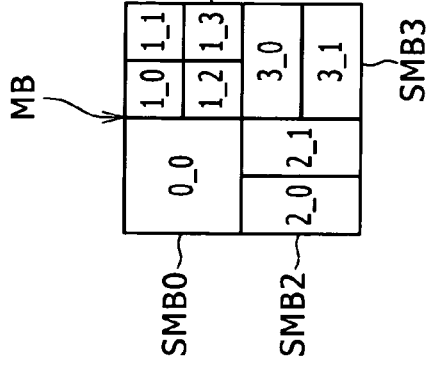

FIG. 8B
INITIAL STATE

Index0_0 field0 FERENCE PLANE#0
Index0_0 field1 FERENCE PLANE#0
Index1_0 field0 FERENCE PLANE#1
Index1_0 field1 FERENCE PLANE#1
Index1_1 field0 FERENCE PLANE#1
Index1_1 field1 FERENCE PLANE#1
Index1_2 field0 FERENCE PLANE#1
Index1_2 field1 FERENCE PLANE#1
Index1_3 field0 FERENCE PLANE#1
Index1_3 field1 FERENCE PLANE#1
Index2_0 field0 FERENCE PLANE#0
Index2_0 field1 FERENCE PLANE#0
Index2_1 field0 FERENCE PLANE#1
Index2_1 field1 FERENCE PLANE#1
Index3_0 field0 FERENCE PLANE#1
Index3_0 field1 FERENCE PLANE#1
Index3_1 field0 FERENCE PLANE#1
Index3_1 field1 FERENCE PLANE#1

FIG. 8C
LIST IN EFFECT FOLLOWING PROCESS ST1

Index0_0 field0 FERENCE PLANE#0
Index0_0 field1 FERENCE PLANE#0
Index2_0 field0 FERENCE PLANE#0
Index2_0 field1 FERENCE PLANE#0
Index2_1 field0 FERENCE PLANE#1
Index2_1 field1 FERENCE PLANE#1
Index1_0 field0 FERENCE PLANE#1
Index1_0 field1 FERENCE PLANE#1
Index1_1 field0 FERENCE PLANE#1
Index1_1 field1 FERENCE PLANE#1
Index1_2 field0 FERENCE PLANE#1
Index1_2 field1 FERENCE PLANE#1
Index1_3 field0 FERENCE PLANE#1
Index1_3 field1 FERENCE PLANE#1
Index3_0 field0 FERENCE PLANE#1
Index3_0 field1 FERENCE PLANE#1
Index3_1 field0 FERENCE PLANE#1
Index3_1 field1 FERENCE PLANE#1

FIG. 8D
LIST IN EFFECT FOLLOWING PROCESS ST4

Index0_0 field0 FERENCE PLANE#0
Index2_0 field0 FERENCE PLANE#0
Index2_1 field0 FERENCE PLANE#0
Index0_0 field1 FERENCE PLANE#0
Index2_0 field1 FERENCE PLANE#0
Index2_1 field1 FERENCE PLANE#0
Index1_0 field0 FERENCE PLANE#1
Index1_1 field0 FERENCE PLANE#1
Index1_2 field0 FERENCE PLANE#1
Index1_3 field0 FERENCE PLANE#1
Index3_0 field0 FERENCE PLANE#1
Index3_1 field0 FERENCE PLANE#1
Index1_0 field1 FERENCE PLANE#1
Index1_1 field1 FERENCE PLANE#1
Index1_2 field1 FERENCE PLANE#1
Index1_3 field1 FERENCE PLANE#1
Index3_0 field1 FERENCE PLANE#1
Index3_1 field1 FERENCE PLANE#1

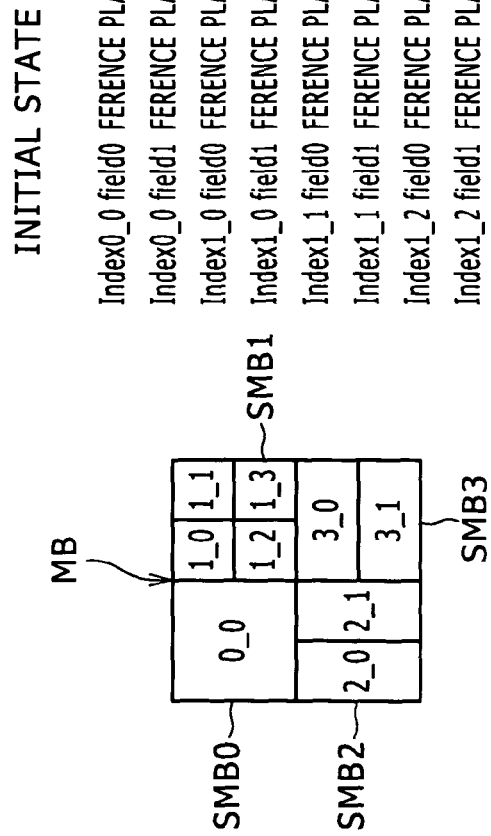

MEMORY REQUEST ORDERING FOR A MOTION COMPENSATION PROCESS, IMPLEMENTED BY A PICTURE PROCESSING APPARATUS, A PICTURE PROCESSING METHOD, AND A PICTURE PROCESSING PROGRAM

BACKGROUND OF THE INVENTION

1. Field of the Invention

The present invention relates to a picture processing apparatus, a picture processing method, and a program for processing a digital picture.

2. Description of the Related Art

The recent years have witnessed widespread acceptance of picture processing apparatuses that handle picture information in digitized form for highly efficient transmission and storage of the picture information by taking advantage of redundancies specific to this type of information. Particularly in widespread use is the kind of apparatus that conforms to the MPEG (Moving Picture Experts Group) standard or the like involving data compression through orthogonal transformation such as DCT (Discrete Cosine Transform) and motion compensation.

Predicting motion compensation is thus one of the important elements of moving picture compression encoding and decoding technology. Motion-compensating prediction is a technique for detecting how a series of pictures making up a moving picture has moved and utilizing pixel information derived from the detection as predicted pictures for efficient compression.

According to typical moving picture compression techniques such as the MPEG, motion-compensating prediction is effected by comparing each of divisions called macro blocks (MB) making up each picture with the pixel information of the preceding or subsequent picture in order of display. Such moving picture compression techniques involve the use of a motion vector indicative of the direction and magnitude of a motion. The picture to be compared with is called the reference picture or reference plane hereunder.

MPEG-4 AVC (Advanced Video Coding) established recently as a new moving picture compression encoding and decoding standard introduces novel techniques intended to enhance the efficiency of encoding in motion-compensating prediction.

One of these techniques for AVC allows a different reference plane and a different motion vector to be designated for each macro block or for each of two or four divisions making up the whole macro block, as shown in FIGS. 1A through 1D.

Where a given macro block is divided into four divisions, each of the divisions is called a sub-macro block. As indicated in FIGS. 2A through 2D, a different motion vector can be further designated for each sub-macro block or for each of two or four divisions constituting the whole sub-macro block.

The dividing of the macro block is also available for bidirectional motion-compensating prediction, so that a different motion vector can be designated for each of up to eight different reference pictures and for up to 32 divisions making up each macro block. In practice, however, there are level constraints on the number of motion vectors regarding two adjacent macro blocks.

Another technique for motion-compensating prediction under the MPEG-4 AVC involves the use of a six-tap interpolation filter with regard to brightness information. For this reason, as shown in FIGS. 3A through 3C, the processing of the interpolation filter requires transferring from an external memory five pixels of pixel information for each of both the vertically and the horizontally enlarged areas encompassing each of the divisions constituting macro block.

SUMMARY OF THE INVENTION

The above-mentioned two techniques for AVC have a far larger amount of pixel information that needs to be transferred from the external memory for motion-compensating prediction per macro block than the encoding technique of existing standards such as the MPEG-2. For that reason, under certain conditions, the amount of data to be transferred from the external memory for motion-compensating prediction during the picture encoding and decoding process takes up much of the amount of data transferred within the whole system. This can pose a performance bottleneck for the encoding and decoding circuits involved.

In acquiring from the external memory the pixel data needed for motion-compensating prediction in units of macro blocks, it is necessary to calculate the addresses of the external memory based on information about each macro block and to request access to the calculated addresses.

The macro block information includes information about the position of each macro block, about the predicted direction of the macro block (bidirectional or unidirectional), about the divisions of the macro block, and about the reference plane for each of the divisions.

The macro block information further includes information about the divisions of each sub-macro block, about whether the picture containing the macro block is an interlace frame picture, a progressive frame picture, or a field picture; and motion vector information about each of the divisions.

In general, address requests to the external memory based on the macro block information are handled successively in keeping with the divisions within each macro block. If the macro block is divided as indicated in FIG. 4, then addresses are calculated for divisions Nos. 0-0, 1-0, 1-1, 1-2, 1-3, 2-0, 2-1, 3-0, and 3-1, in that order, and access requests are issued in that order as well.

If the interlace frame picture is to be handled, each of the divisions entails having two address requests issued, one for first field data and the other for second field data regarding the division in question.

A major disadvantage of the above procedure for issuing address requests resides in the following point:

In a series of address requests, the addresses being requested vary frequently and widely, so that the low-address boundary of the external memory (DRAM) is crossed quite frequently. As a result, the clock count for an active command and a pre-charge command becomes high and transfer efficiency declines.

Such a drop in transfer efficiency persists even if a so-called bank interleave arrangement is adopted whereby reference pictures are mapped to a plurality of banks of the external memory (DRAM) in order to enhance transfer efficiency.

The present invention has been made in view of the above circumstances and provides a picture processing apparatus, a picture processing method, and a program capable of improving the efficiency in transferring pixel information from a memory during motion compensation.

In carrying out the present invention and according to one embodiment thereof, there is provided a picture processing apparatus including: a memory; and an encoding and/or decoding circuit configured to encode input picture data through data exchange with the memory and to decode the input encoded picture data through data exchange with the memory; wherein the memory holds a first field and a second field of the decoded picture in different areas while holding field planes of a plurality of reference planes in different areas; the encoding and/or decoding circuit includes a motion compensation circuit configured to effect motion-compensating prediction by dividing into a plurality of divisions each of macro blocks making up the picture data in order to perform motion compensation in accordance with the motion-compensating prediction; and, upon transferring the decoded picture held in the memory during a motion compensation process, the motion compensation circuit rearranges transfer requests to at least either the same reference plane or the same field plane within a divided macro block on the basis of macro block division information and reference picture information, before transferring the rearranged transfer requests consecutively to the memory.

According to another embodiment of the present invention, there is provided a picture processing method including the steps of: upon decoding encoded picture data, holding a first field and a second field of a decoded picture in different areas of a memory; holding field planes of a plurality of reference planes in different areas of the memory; and upon transferring the decoded picture held in the memory during a motion compensation process, rearranging transfer requests to at least either the same reference plane or the same field plane within a divided macro block on the basis of macro block division information and reference picture information, before transferring the rearranged transfer requests consecutively.

According to a further embodiment of the present invention, there is provided a program for causing a computer to execute a picture processing procedure including the steps of: upon decoding encoded picture data or encoding picture data, holding a first field and a second field of a decoded picture in different areas of a memory; holding field planes of a plurality of reference planes in different areas of the memory; and upon transferring the decoded picture held in the memory during a motion compensation process, rearranging transfer requests to at least either the same reference plane or the same field plane within a divided macro block on the basis of macro block division information and reference picture information, before transferring the rearranged transfer requests consecutively.

According to the embodiments of the present invention, as outlined above, the first and the second fields of the decoded picture are held in separate areas of the memory, and so are the field planes of a plurality of reference planes. During the motion compensation process performed by the motion compensation circuit, transfer requests to at least either the same reference plane or the same field plane are rearranged within a divided macro block on the basis of macro block division information and reference picture information, and the rearranged requests are transferred consecutively to the memory.

Thus according to the embodiments of the present invention, it is possible to improve the efficiency in transferring pixel information from the memory during motion compensation.

BRIEF DESCRIPTION OF THE DRAWINGS

Further advantages of the present invention will become apparent upon a reading of the following description and appended drawings in which:

FIGS. 1A, 1B, 1C and 1D are schematic views showing typical divisions of a macro block;

FIGS. 2A, 2B, 2C and 2D are schematic views showing typical divisions of a sub-macro block;

FIGS. 3A, 3B and 3C are schematic views explanatory of pixels necessary for an interpolation filter;

Figure 4:
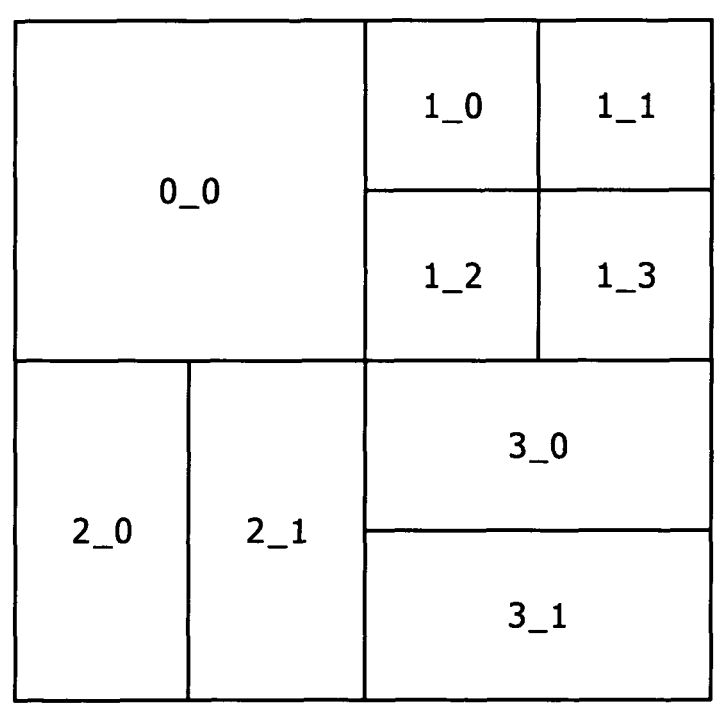

FIG. 4 is a schematic view showing other typical divisions of the macro block;

FIGS. 8A, 8B, 8C and 8D are schematic views showing how addresses are typically rearranged for a macro block included in an interlace frame picture;

FIGS. 11A, 11B and 11C are schematic views showing how addresses generated with the third algorithm in FIG. 10 are typically rearranged for a macro block included in an interlace frame picture.

DETAILED DESCRIPTION OF THE PREFERRED EMBODIMENTS

The preferred embodiments of the present invention will now be described in reference to the accompanying drawings. The description will be made under the following headings:

1. Overall structure of the picture processing apparatus
2. First typical algorithm for generating address requests
3. Second typical algorithm for generating address requests
4. Third typical algorithm for generating address requests <1. Overall Structure of the Picture Processing Apparatus>

Figure 5:
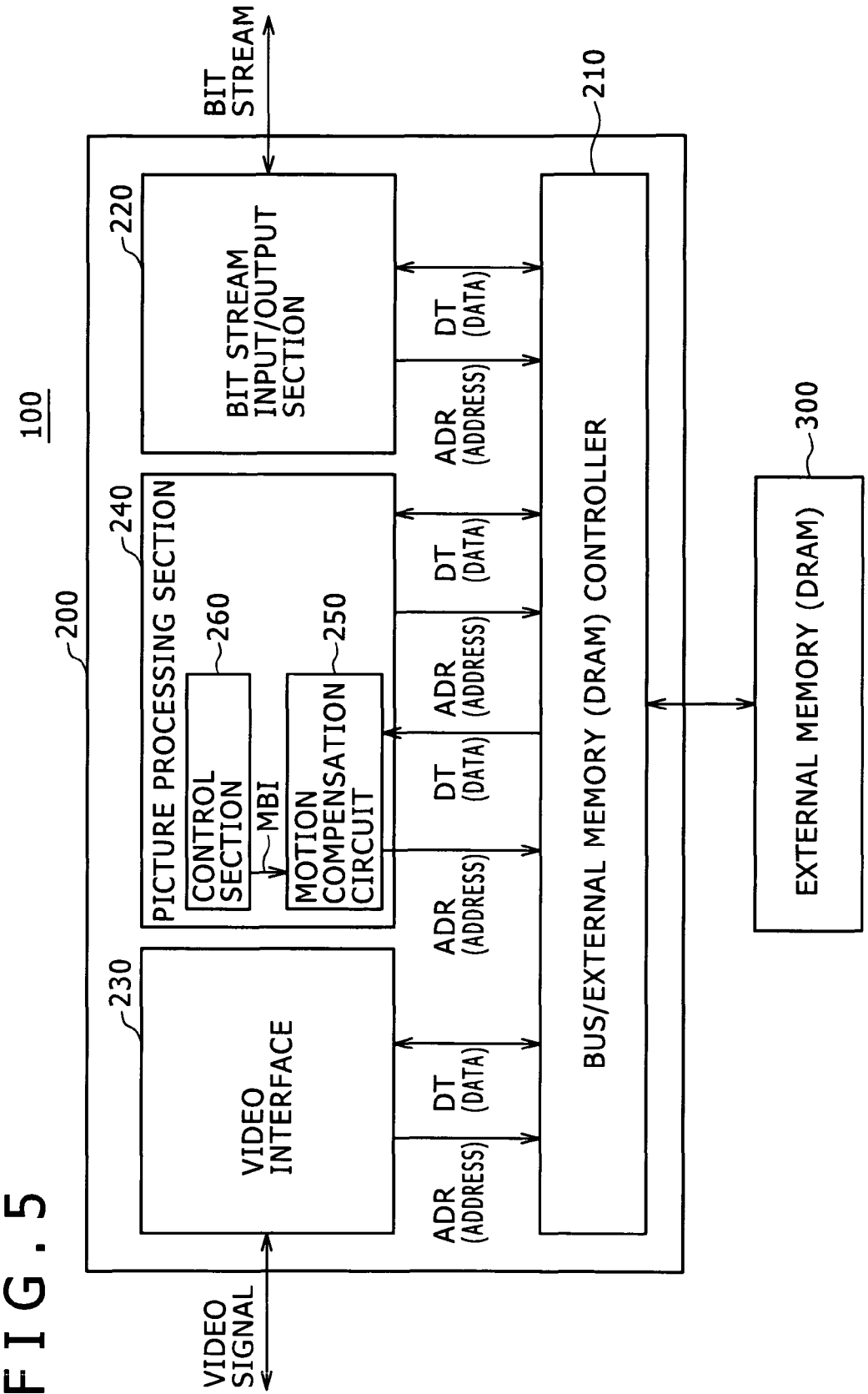
FIG. 5 is a block diagram showing a typical structure of a picture processing apparatus according to an embodiment of the present invention.

FIG. 5 is a block diagram showing a typical structure of a picture processing apparatus 100 according to an embodiment of the present invention. As shown in FIG. 5, the picture processing apparatus 100 includes a picture encoding/decoding circuit 200 and an external memory 300 such as a DRAM. The picture encoding/decoding circuit 200 includes a bus/external memory (DRAM) controller 210, a bit stream input/output section 220, a video interface 230, and a picture processing section 240. It should be noted that in FIG. 5, reference characters ADR stand for an address and DT for data.

The picture processing apparatus 100 according to an embodiment of the present invention has the ability to decode the picture data having been encoded according to the MPEG standard. The picture processing apparatus 100 holds a first field "Field0" and a second field "Field1" of a decoded picture in separate areas of the external memory 300 such as a DRAM while holding a plurality of field planes for reference purposes also in separate areas of the memory.

The picture processing apparatus 100 has a motion compensation capability. Upon transferring the decoded picture held in the external memory 300 during motion compensation, the picture processing apparatus 100 with its motion compensation capability performs "rearranged transfer," to be described below, in order to improve the efficiency in transferring pixel information from the external memory 300.

On the basis of macro block (MB) division information and reference picture information, the picture processing apparatus 100 is capable of rearranging transfer requests to at least either the same reference plane or the same field plane within a divided macro block MB, before transferring the rearranged transfer requests.

For example, upon transferring the decoded picture held in the external memory 300, the picture processing apparatus 100 has the ability to rearrange transfer requests to the same field plane of the divisions having the same reference plane within the divided macro block MB, before transferring the rearranged transfer requests in concatenated fashion.

Alternatively, upon transferring the decoded picture held in the external memory 300, the picture processing apparatus 100 has the ability to rearrange transfer requests to the same field plane and to the same reference plane within the divided macro block MB, before transferring the rearranged transfer requests in concatenated fashion.

The above-mentioned rearranged transfer capability can be applied likewise to apparatuses which encode picture data according to the MPEG standard and which perform motion compensation. Specifically, on the basis of macro block (MB) division information and reference picture information, the picture processing apparatus 100 may hold a first and a second field of a locally decoded picture in separate areas of the external memory 300 while holding a plurality of field planes for reference purposes also in separate areas of the memory 300 during motion compensation.

That is, on the basis of macro block (MB) division information and reference picture information, the picture processing apparatus 100 is capable of rearranging transfer requests to at least either the same reference plane or the same field plane within a divided macro block MB, before transferring the rearranged transfer requests.

For example, upon transferring the decoded picture held in the external memory 300, the picture processing apparatus 100 is capable of rearranging transfer requests to the same field plane of the divisions having the same reference plane within the divided macro block MB, before transferring the rearranged transfer requests in concatenated fashion.

Alternatively, upon transferring the decoded picture held in the external memory 300, the picture processing apparatus 100 is capable of rearranging transfer requests to the same field plane and to the same reference plane within the divided macro block MB, before transferring the rearranged transfer requests in concatenated fashion.

The structures and functions of the components making up the picture processing apparatus 100 are explained in specific terms. The bus/external memory controller 210 controls the transfer of data among the bit stream input/output section 220, video interface 230, and picture processing section 240. The bus/external memory controller 210 further controls the transfer of addresses (ADR) and data (DT) between each of the bit stream input/output section 220, the video interface 230 and picture processing section 240 on the one hand and the external memory 300 on the other hand.

The bit stream input/output section 220 inputs bit stream data through the bus/external memory controller 210, the input bit stream data being obtained by the picture processing section 240 through its encoding process. The stream input/output section 220 proceeds to output the input bit stream data to an external device.

The bit stream input/output section 220 also inputs bit stream data and transfers the input data to the picture processing section 240 via the bus/external memory controller 210. Furthermore, the bit stream input/output section 220 can access the external memory 300 through the bus/external memory controller 210.

The video interface 230 illustratively inputs picture data (i.e., video signal) desired to be encoded and transfers the input picture data to the picture processing section 240 via the bus/external memory controller 210. Illustratively, the video interface 230 inputs via the bus/external memory controller 210 the picture data (video signal) to be encored by the picture processing section 240 and sends the input picture data to an external video device. The video interfaced 230 can access the external memory 300 through the bus/external memory controller 210.

The picture processing section 240 encodes illustratively the picture data (video signal) to be encoded following input through the video interface 230. After the encoding, the picture processing section 240 transfers the picture data as bit stream data to the bit stream data input/output section 220 via the bus/external memory controller 210. The picture processing section 240 also decodes the bit stream data input through the bit stream input/output section 220 and transfers the decoded data to the video interface 230 via the bus/external memory controller 210.

The picture processing section 240 includes a motion compensation circuit 250 and a control section 260. Upon carrying out encoding and decoding processes, the motion compensation circuit 250 is capable of effecting motion-compensating prediction by dividing into a plurality of divisions each of macro blocks making up the picture data in order to perform motion compensation in accordance with the motion-compensating prediction.

The motion compensation circuit 250 has the ability to rearrange transfer requests to at least either the same reference plane or the same field plane within a divided macro block MB on the basis of macro block division information and reference picture information, before transferring the rearranged transfer requests in concatenated fashion.

Illustratively, upon transferring the decoded picture held in the external memory 300, the motion compensation circuit 250 has the ability to rearrange transfer requests to the same field plane of the divisions having the same reference plane within the divided macro block MB, before transferring the rearranged transfer requests in concatenated fashion.

Alternatively, upon transferring the decoded picture held in the external memory 300, the motion compensation circuit 250 has the ability to rearrange transfer requests to the same field plane and to the same reference plane within the divided macro block MB, before transferring the rearranged transfer requests in concatenated fashion.

Inside the picture processing section 240, the motion compensation circuit 250 is connected in such a manner as to exchange data with the external memory (DRAM) 300 through the bus/external memory (DRAM) controller 210.

Figure 6:
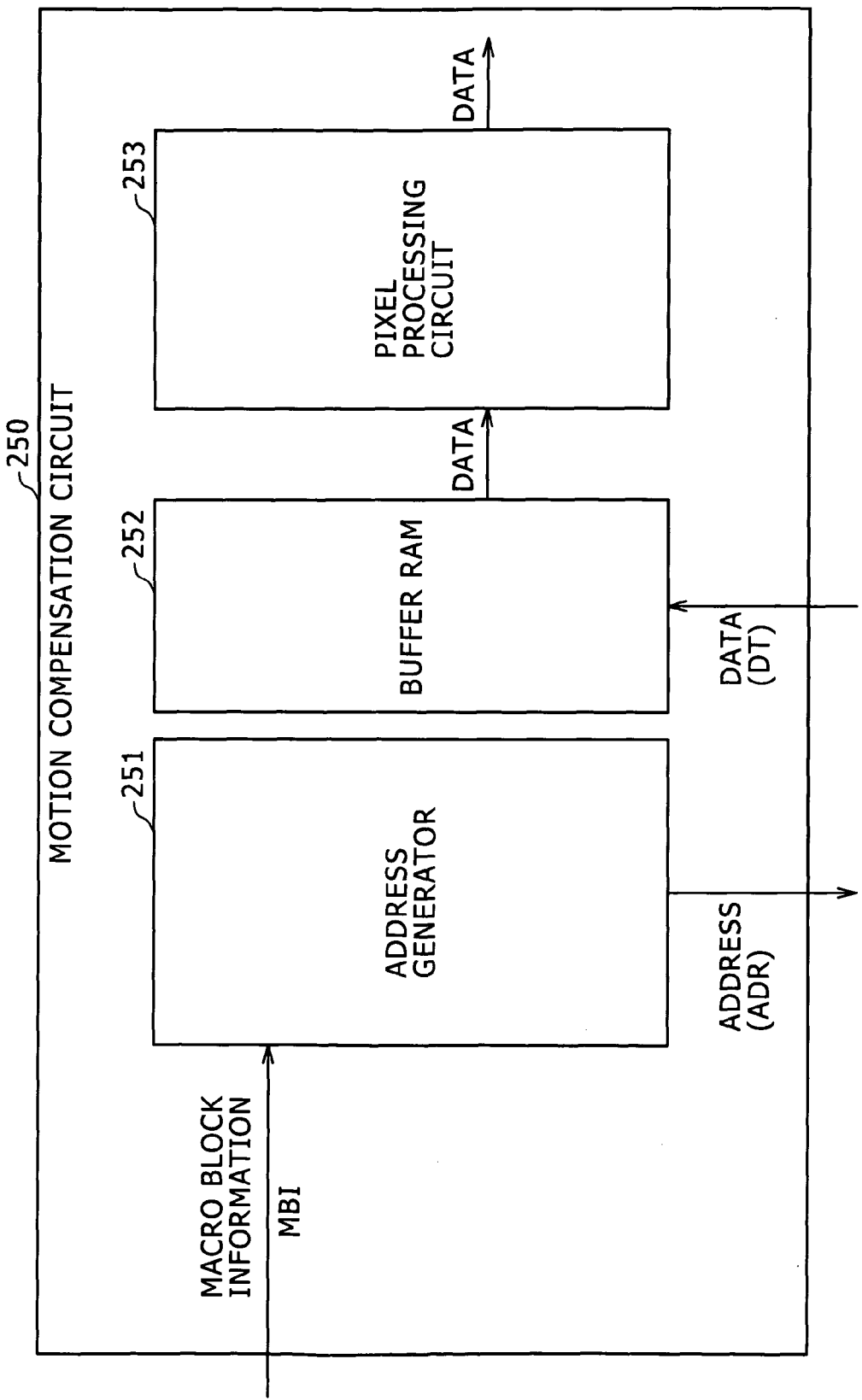
FIG. 6 is a block diagram showing a typical structure of a motion compensation circuit included in FIG. 5.

FIG. 6 is a block diagram showing a typical structure of the motion compensation circuit 250 included in FIG. 5. As indicated in FIG. 6, the motion compensation circuit 250 includes an address generator 251, a buffer RAM 252, and a pixel processing circuit 253.

The address generator 251 in the motion compensation circuit 250 acquires macro block information MBI from the controller 260 in the picture processing section 240 regarding the macro block subject to motion compensation. Based on the macro block information MBI, the address generator 251 calculates the addresses to be requested of the external memory (DRAM) 300 and sends the address requests to the bus/external memory (DRAM) controller 210.

On the basis of the address requests from the motion compensation circuit 250, the bus/external memory (DRAM) controller 210 issues commands such as active and pre-charge commands to the external memory (DRAM) 300 and forwards the transferred data to the motion compensation circuit 250.

The transferred data is stored in the buffer RAM 252 inside the motion compensation circuit 250, before being forwarded to the downstream pixel processing circuit 253. The pixel processing circuit 253 illustratively carries out a filtering process using a spatial interpolation filter in connection with motion compensation.

What follows is a more specific explanation of the algorithms used by the address generator 251 in the motion compensation circuit 250 to generate address requests based on macro block information as one capability characteristic of this embodiment of the invention.

<2. First Typical Algorithm for Generating Address Requests>

Figure 7:
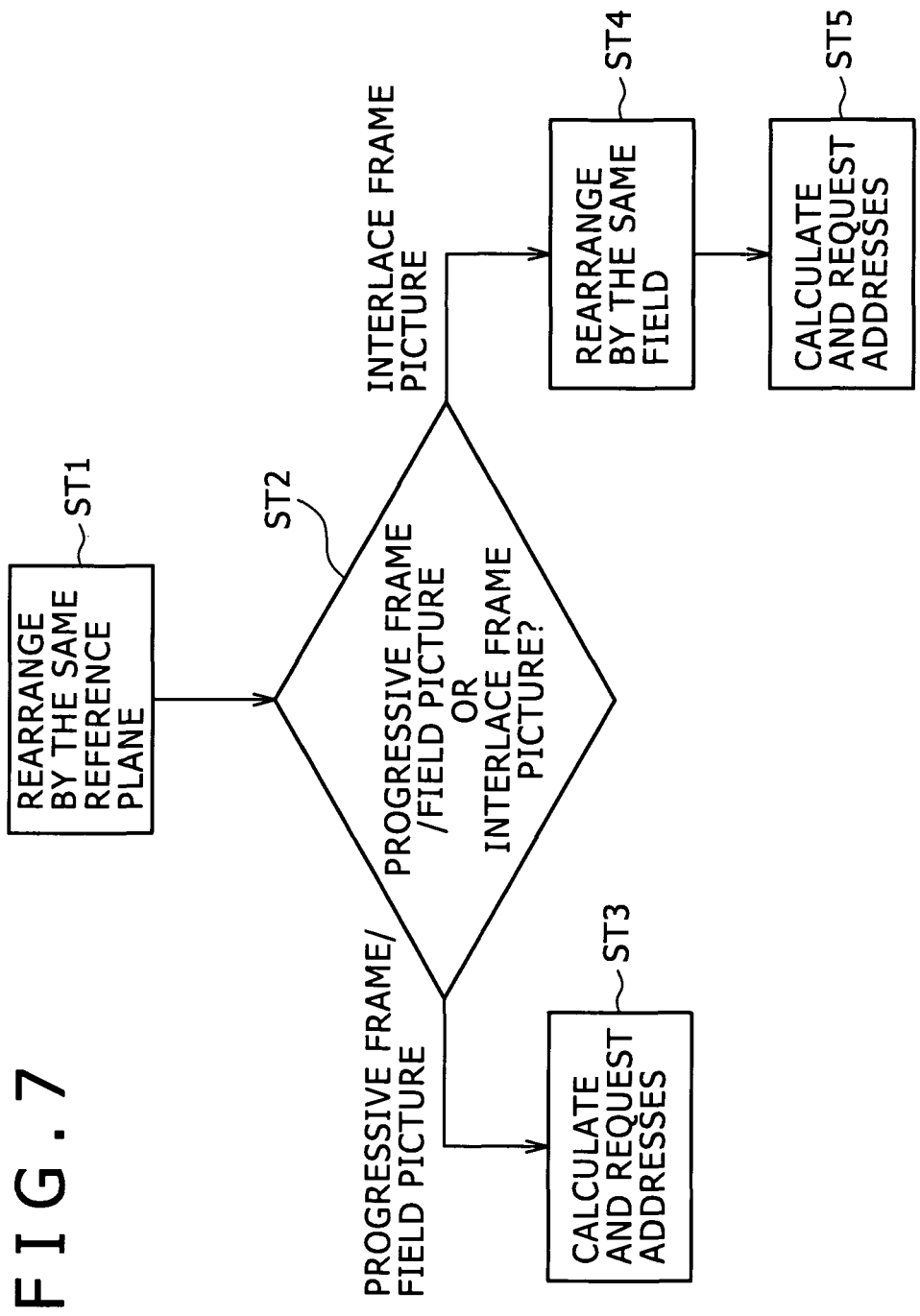
FIG. 7 is a flowchart showing a first algorithm used by an address generator to generate address requests based on macro block information.

FIG. 7 is a flowchart showing the first algorithm used by the address generator 251 to generate address requests based on macro block information. The macro block information MBI input to the motion compensation circuit 250 from the control section 260 of the picture processing circuit 240 includes the following information:

The macro block information MBI includes information about the position of each macro block, about the predicted direction of the macro block (bidirectional or unidirectional), about the divisions of the macro block, about the reference plane for each of the divisions, and about the divisions of each sub-macro block.

The macro block information MBI further includes information whether the picture of interest is a frame picture or a field picture, and motion vector information about each of the divisions.

In step ST1 of FIG. 7, the address generator 251 rearranges all divisions of the macro block in such a manner that the divisions having the same reference plane continue based on the information about the reference plane for each of the divisions.

Then in step ST2, the address generator 251 determines whether the macro block to be processed is included in a progressive frame picture or a field picture on the one hand, or in an interlace frame picture on the other hand.

If in step ST2 the macro block in question is found included in a progressive frame picture or a field picture, then the address generator 251 goes to step ST3 and issues address requests based on a motion vector in order of the numbers of the divisions having the same reference plane.

If in step ST2 the macro block in question is found included in an interlace frame picture, the address generator 251 goes to step ST4 following the rearranging in step ST1. In step ST4, the address generator 251 rearranges the divisions in such a manner that the address requests to a first field "Field0" and a second field "Field1" continue within the divisions having the same reference plane. In step ST5, the address generator 251 issues the address requests in order of the numbers of the rearranged divisions.

FIGS. 8A, 8B, 8C and 8D are schematic views showing how addresses are typically rearranged for a macro block included in an interlace frame picture. FIG. 8A indicates typical divisions of a macro block MB. The macro block MB is divided into sub-macro blocks SMB0, SMB1, SMB2, and SMB3.

The sub-macro block SMB1 further includes blocks SMB1_0, SMB1_1, SMB1_2, and SMB1_3. The sub-macro block SMB2 further includes blocks SMB2_0 and SMB2_1. The sub-macro block SMB3 further includes blocks SMB3_0 and SMB3-1. In this example of divisions, the individually divided blocks are distinguished by division numbers "0-0," "1-0," "1-1," "1-2," "1-3," "2-0," "2-1," "3-0," and "3-1."

FIGS. 8B through 8D show typical orders in which addresses are to be issued. FIG. 8B gives a list of the initial state showing how the addresses to be issued are arranged in order of the divisions of the macro block. FIG. 8C shows a list in effect following the processing of step ST1 in FIG. 7, and FIG. 8D indicates a list in effect following the processing of step ST4 in FIG. 7.

The list of the initial state in FIG. 8B shows the following order: The addresses are to be issued in order of division numbers "0-0," "1-0," "1-1," "1-2," "1-3," "2-0," "2-1," "3-0," and "3-1." Each block of each division number corresponds to the first field "Field0" and the second field "Field1."

The list at its beginning is made of "Index0_0 field0 reference plane #0," "Index0_0 field1 reference plane #0," "Index1_0 field0 reference plane #1," "Index1_0 field1 reference plane #1," "Index1_1 field0 reference plane #1," and "Index1_1 field1 reference plane #1," in that order.

The above portion of the list is followed by "Index1_2 field0 reference plane #1," "Index1_2 field1 reference plane #1," "Index1_3 field0 reference plane #1," and "Index1_3 field1 reference plane #1," in that order.

The above portion of the list is then followed by "Index2_0 field0 reference plane #0," "Index2_0 field1 reference plane #0," "Index2_1 field0 reference plane #0," and "Index2_1 field1 reference plane #0," in that order.

The above portion of the list is also followed by "Index3_0 field0 reference plane #1," "Index3_0 field1 reference plane #1," "Index3_1 field0 reference plane #1," and "Index3_1 field1 reference plane #1," in that order.

The list of FIG. 8C is given after the list of FIG. 8B is rearranged by the same reference plane. The list of FIG. 8C at its beginning is made of "Index0_0 field0 reference plane #0," "Index0_0 field1 reference plane #0," "Index2_0 field0 reference plane #0," "Index2_0 field1 reference plane #0," "Index2_1 field0 reference plane #0," and "Index2_1 field1 reference plane #0," in that order.

The above portion of the list is followed by "Index1_0 field0 reference plane #1," "Index1_0 field1 reference plane #1," "Index1_1 field0 reference plane #1," and "Index1_1 field1 reference plane #1," in that order.

The above portion of the list is then followed by "Index1_2 field0 reference plane #1," "Index1_2 field1 reference plane #1," "Index1_3 field0 reference plane #1," and "Index1_3 field1 reference plane #1," in that order.

The above portion of the list is also followed by "Index3_0 field0 reference plane #1," "Index3_0 field1 reference plane #1," "Index3_1 field0 reference plane #1," and "Index3_1 field1 reference plane #1," in that order.

The list of FIG. 8D is given after the list of FIG. 8C is rearranged by the same field in relation to the interlace frame. The list of FIG. 8D at its beginning is made of "Index0_0 field0 reference plane #0," "Index2_0 field0 reference plane #0," "Index2_1 field0 reference plane #0," "Index0_0 field1 reference plane #0," "Index2_0 field1 reference plane #0," and "Index2_1 field1 reference plane #0," in that order.

The above portion of the list is followed by "Index1_0 field0 reference plane #1," "Index1_1 field0 reference plane #1," "Index1_2 field0 reference plane #1," and "Index1_3 field0 reference plane #1," in that order.

The above portion of the list is then followed by "Index3_0 field0 reference plane #1," "Index3_1 field0 reference plane #1," "Index1_0 field1 reference plane #1," and "Index1_1 field1 reference plane #1," in that order.

The above portion of the list is also followed by "Index1_2 field1 reference plane #1," "Index1_3 field1 reference plane #1," "Index3_0 field1 reference plane #1," and "Index3_1 field1 reference plane #1," in that order.

The above are the lists made up of the fields and reference plane information with regard to the divisions involved. FIG.

8B shows the list formed after the addresses to be issued are rearranged into the order of the divisions of the macro block. Performing step ST1 on the list of FIG. 8B provides the list of FIG. 8C. Since the macro block to be processed is included in an interlace frame, step ST2 is followed by step ST4 whereby the list of FIG. 8D is formed. In step ST5, address requests are generated in the listed order in keeping with the reference planes being mapped in the DRAM based on motion vector information.

<3. Second Typical Algorithm for Generating Address Requests>

Figure 9:
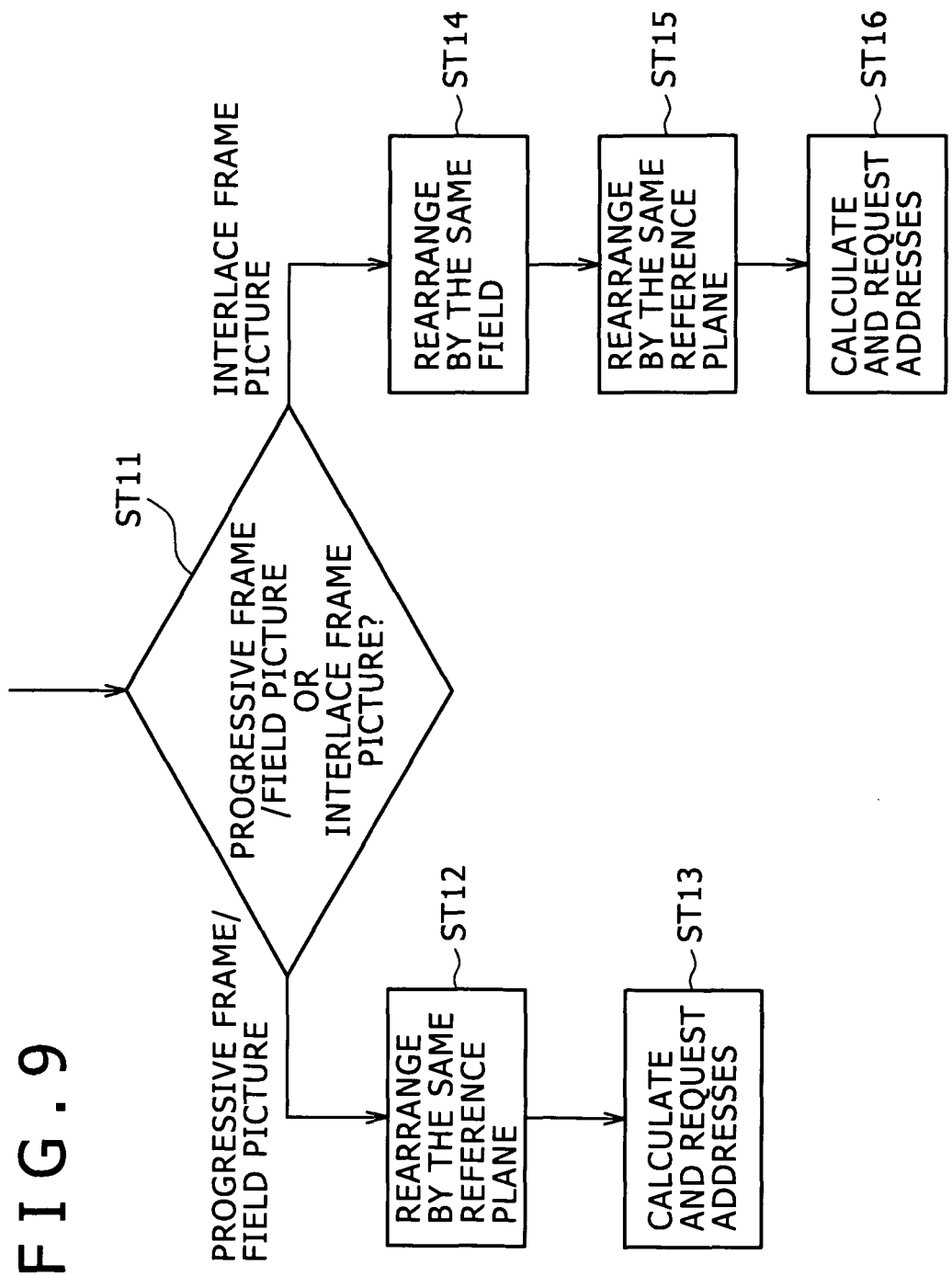
FIG. 9 is a flowchart showing a second algorithm used by the address generator to generate address requests based on macro block information.

FIG. 9 is a flowchart showing the second algorithm used by the address generator 251 to generate address requests based on macro block information. The second algorithm in FIG. 9 is given as a first variation of the algorithm used by the address generator 251 to generate the address requests based on the macro block information.

In step ST11 of the second algorithm, the address generator 251 first determines whether a progressive frame/field picture or an interlace frame picture is in effect. If in step ST11 a progressive frame/field picture is found to be in effect, the address generator 251 goes to step ST12 in which the divisions are rearranged by the same reference plane. Step ST12 is followed by step ST13 in which the address generator 251 generates address requests.

If in step ST11 an interlace frame is found to be in effect, the address generator 251 goes to step ST14 in which the divisions are rearranged by the same field. In step ST15, the address generator 251 rearranges the divisions by the same reference plane. In step ST16, the address generator 251 generates address requests.

<4. Third Typical Algorithm for Generating Address Requests>

Figure 10:
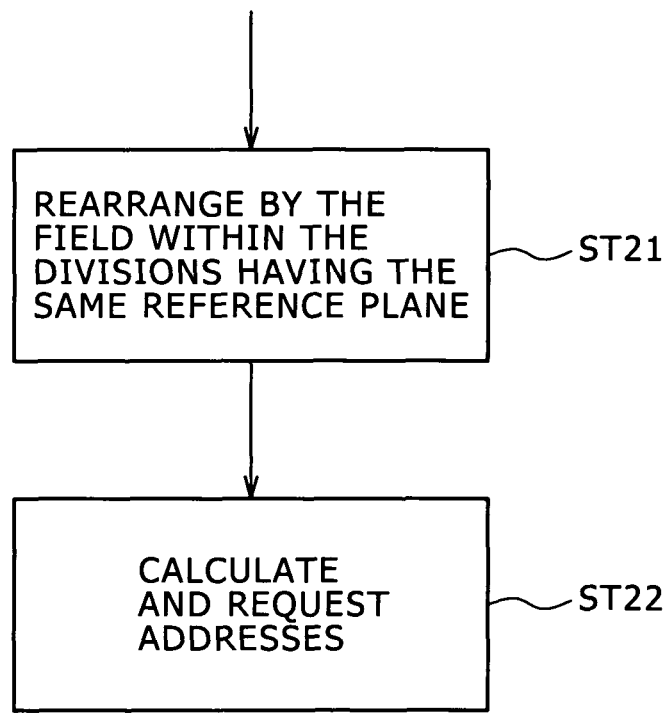
FIG. 10 is a flowchart showing a third algorithm used by the address generator to generate address requests based on macro block information.

FIG. 10 is a flowchart showing the third algorithm used by the address generator 251 to generate address requests based on macro block information. The third algorithm in FIG. 10 is given as a second variation of the algorithm used by the address generator 251 to generate the address requests based on the macro block information.

In step ST21 of the third algorithm, the address generator 251 rearranges the divisions not by the reference plane but solely by the field within the divisions having the same reference plane. Then in step ST22, the address generator 251 generates address requests.

FIGS. 11A, 11B and 11C are schematic views showing how the addresses generated by the third algorithm in FIG. 10 are typically rearranged for a macro block included in an interlace frame picture. FIG. 11A indicates typical divisions of the macro block MB. The macro block MB is divided into sub-macro blocks SMB0, SMB1, SMB2, and SMB3.

The sub-macro block SMB1 further includes blocks SMB1_0, SMB1_1, SMB1_2, and SMB1_3. The sub-macro block SMB2 further includes blocks SMB2_0 and SMB2_1. The sub-macro block SMB3 further includes blocks SMB3_0 and SMB3-1. In this example of divisions, the individually divided blocks are distinguished by division numbers "0-0," "1-0," "1-1," "1-2," "1-3," "2-0," "2-1," "3-0," and "3-1."

FIGS. 11B and 11C show typical orders in which addresses are to be issued. FIG. 11B gives a list of the initial state showing how the addresses to be issued are arranged in order of the divisions of the macro block. FIG. 11C shows a list given after the divisions are rearranged solely by the field within the divisions having the same reference plane.

The list of the initial state in FIG. 11B shows the following order: The addresses are to be issued in order of division numbers "0-0," "1-0," "1-1," "1-2," "1-3," "2-0," "2-1," "3-0," and "3-1." Each block of each division number corresponds to the first field "Field0" and the second field "Field1."

The list at its beginning is made of "Index0_0 field0 reference plane #0," "Index0_0 field1 reference plane #0," "Index1_0 field0 reference plane #1," "Index1_0 field1 reference plane #1," "Index1_1 field0 reference plane #1," and "Index1_1 field1 reference plane #1," in that order.

The above portion of the list is followed by "Index1_2 field0 reference plane #1," "Index1_2 field1 reference plane #1," "Index1_3 field0 reference plane #1," and "Index1_3 field1 reference plane #1," in that order.

The above portion of the list is then followed by "Index2_0 field0 reference plane #0," "Index2_0 field1 reference plane #0," "Index2_1 field0 reference plane #0," and "Index2_1 field1 reference plane #0," in that order.

The above portion of the list is also followed by "Index3_0 field0 reference plane #1," "Index3_0 field1 reference plane #1," "Index3_1 field0 reference plane #1," and "Index3_1 field1 reference plane #1," in that order.

The list of FIG. 11C is given after the list of FIG. 11B is rearranged by the field within the divisions having the same reference plane. The list of FIG. 11C at its beginning is made of "Index0_0 field0 reference plane #0," "Index0_0 field1 reference plane #0," "Index1_0 field0 reference plane #1," "Index1_1 field0 reference plane #1," "Index1_2 field0 reference plane #1," and "Index1_3 field0 reference plane #1," in that order.

The above portion of the list is followed by "Index1_0 field1 reference plane #1," "Index1_1 field1 reference plane #1," "Index1_2 field1 reference plane #1," and "Index1_3 field1 reference plane #1," in that order.

The above portion of the list is then followed by "Index2_0 field0 reference plane #0," "Index2_1 field0 reference plane #0," "Index2_0 field1 reference plane #0," and "Index2_1 field1 reference plane #0," in that order.

The above portion of the list is also followed by "Index3_0 field0 reference plane #1," "Index3_1 field0 reference plane #1," "Index3_0 field1 reference plane #1," and "Index3_1 field1 reference plane #1," in that order.

As in the case of FIG. 8B, FIG. 11B shows the list given after the addresses to be issued are rearranged into the order of the divisions of the macro block. The list of FIG. 11C is formed after the address generator 251 has performed step ST21 on the list of FIG. 11B, whereby the addresses are rearranged by the field within the divisions having the same reference plane. Thereafter, the address generator 251 in step ST22 generates address requests in the listed order in keeping with the reference planes being mapped in the DRAM based on motion vector information.

According to the above-described embodiment, the picture processing apparatus 100 is characteristically structured to include the picture processing section 240 for encoding and decoding purposes inside the encoding and decoding circuit 200.

The picture processing section 240 includes the motion compensation circuit 250 and the control section 260. Upon carrying out encoding and decoding processes, the motion compensation circuit 250 is capable of effecting motion-compensating prediction by dividing into a plurality of divisions each of macro blocks making up the picture data in order to perform motion compensation in accordance with the motion-compensating prediction.

The motion compensation circuit 250 has the ability to rearrange transfer requests to at least either the same reference plane or the same field plane within a divided macro block MB on the basis of macro block division information and reference picture information, before transferring the rearranged transfer requests in concatenated fashion.

Illustratively, upon transferring the decoded picture held in the external memory 300, the motion compensation circuit 250 has the ability to rearrange transfer requests to the same field plane of the divisions having the same reference plane within the divided macro block MB, before transferring the rearranged transfer requests in concatenated fashion.

Alternatively, upon transferring the decoded picture held in the external memory 300, the motion compensation circuit 250 has the ability to rearrange transfer requests to the same field plane and to the same reference plane within the divided macro block MB, before transferring the rearranged transfer requests in concatenated fashion.

The embodiment of the present invention as described above thus provides the following major benefits:

The above embodiment of the invention makes it possible to improve the efficiency in transferring pixel information from the external memory (DRAM) during motion compensation using circuit devices for decoding the picture data encoded in accordance with the MPEG standard.

The above-described embodiment also improves the efficiency in transferring pixel information from the external memory (DRAM) during motion compensation using circuit devices for encoding picture data in accordance with the MPEG standard.

The picture processing method discussed above in detail may be constituted by programs implementing the steps making up the method, and may be executed by computing equipment such as the CPU. These programs may be stored on recording media such as semiconductor memories, magnetic disks, optical disks or floppy (registered trademark) disks, and may be accessed and executed by a computer loaded with a piece or pieces of such recording media.

The present application contains subject matter related to that disclosed in Japanese Priority Patent Application JP 2008-328066 filed in the Japan Patent Office on Dec. 24, 2008, the entire content of which is hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. A picture processing apparatus comprising:
   a memory; and
   a decoding circuit configured to decode encoded picture data through data exchange with said memory and to store a decoded picture in said memory;
   wherein said memory holds a first field and a second field of the decoded picture and holds a plurality of reference planes, and
   said decoding circuit includes a motion compensation circuit configured to:
      effect motion-compensating prediction by performing a motion compensating process, in which:
         the picture data comprises a plurality of macro blocks, and
         a given macro block of the plurality of macro blocks is divided into a plurality of divisions, with each of the plurality of reference planes being associated with at least one division of the plurality of divisions, and
      upon requesting transfer of data from the decoded picture held in said memory to said decoding circuit during the motion compensation process, controlling an order in which transfer requests to the memory are made for the given macro block on the basis of macro block division information and reference picture information such that the transfer requests are sorted into an order on the basis of at least one of (i) a reference plane to which requested divisions correspond and (ii) which of the first and second fields the requested divisions correspond.

2. The picture processing apparatus according to claim 1, wherein, upon requesting transfer of data from the decoded picture held in said memory during the motion compensation process, said motion compensation circuit controls the order in which transfer requests to the memory are made for the given macro block such that the transfer requests are:
   sorted first into an order on the basis of a reference plane to which requested divisions correspond; and
   sorted second, within each of respective groups of transfer requests corresponding to a same respective reference plane, into an order on the basis of which of the first and second fields the requested divisions correspond.

3. The picture processing apparatus according to claim 1, wherein, upon requesting transfer of data from the decoded picture held in said memory during the motion compensation process, said motion compensation circuit controls the order in which transfer requests to the memory are made for the given macro block such that the transfer requests are:
   sorted first into an order on the basis of which of the first and second fields the requested divisions correspond; and
   sorted second, within each of respective groups of transfer requests corresponding to one of the first and second fields, into an order on the basis of a reference plane to which requested divisions correspond.

4. The picture processing apparatus according to claim 1, wherein, upon requesting transfer of data from the decoded picture held in said memory during the motion compensation process, said motion compensation circuit controls the order in which transfer requests to the memory are made for the given macro block such that:
   the transfer requests are sorted, within each of respective groups of transfer requests corresponding to a same respective sub-macro block, into an order on the basis of which of the first and second fields the requested divisions correspond.

5. A picture processing apparatus comprising:
   a memory; and
   an encoding circuit configured to encode picture data through data exchange with said memory;
   wherein said memory holds a first field and a second field of a decoded picture and holds a plurality of reference planes, and
   said encoding circuit includes a motion compensation circuit configured to:
      effect motion-compensating prediction by performing a motion compensating process, in which:
         the picture data comprises a plurality of macro blocks, and
         a given macro block of the plurality of macro blocks is divided into a plurality of divisions, with each of the plurality of reference planes being associated with at least one division of the plurality of divisions, and
      upon requesting transfer of data from the decoded picture held in said memory to said decoding circuit during the motion compensation process, controlling an order in which transfer requests to the memory are made for the given macro block on the basis of macro block division information and reference picture information such that the transfer requests are sorted into an order on the basis of at least one of (i) a reference plane to which requested divisions correspond and (ii) which of the first and second fields the requested divisions correspond.

6. The picture processing apparatus according to claim 5, wherein, upon requesting transfer of data from the decoded picture held in said memory during the motion compensation process, said motion compensation circuit controls the order in which transfer requests to the memory are made for the given macro block such that the transfer requests are:
  sorted first into an order on the basis of a reference plane to which requested divisions correspond; and
  sorted second, within each of respective groups of transfer requests corresponding to a same respective reference plane, into an order on the basis of which of the first and second fields the requested divisions correspond.

7. The picture processing apparatus according to claim 5, wherein, upon requesting transfer of data from the decoded picture held in said memory during the motion compensation process, said motion compensation circuit controls the order in which transfer requests to the memory are made for the given macro block such that the transfer requests are:
  sorted first into an order on the basis of which of the first and second fields the requested divisions correspond; and
  sorted second, within each of respective groups of transfer requests corresponding to one of the first and second fields, into an order on the basis of a reference plane to which requested divisions correspond.

8. The picture processing apparatus according to claim 5, wherein, upon requesting transfer of data from the decoded picture held in said memory during the motion compensation process, said motion compensation circuit controls the order in which transfer requests to the memory are made for the given macro block such that:
  the transfer requests are sorted, within each of respective groups of transfer requests corresponding to a same respective sub-macro block, into an order on the basis of which of the first and second fields the requested divisions correspond.

9. A picture processing apparatus comprising:
  a memory; and
  an encoding circuit configured to encode input picture data through data exchange with said memory and to decode encoded input picture data thought data exchange with said memory;
  wherein said memory holds a first field and a second field of a decoded picture and holds a plurality of reference planes, and
  said encoding circuit includes a motion compensation circuit configured to:
    effect motion-compensating prediction by performing a motion compensating process, in which:
      the picture data comprises a plurality of macro blocks, and
      a given macro block of the plurality of macro blocks is divided into a plurality of divisions, with each of the plurality of reference planes being associated with at least one division of the plurality of divisions, and
    upon requesting transfer of data from the decoded picture held in said memory to said decoding circuit during the motion compensation process, controlling an order in which transfer requests to the memory on the basis of macro block division information and reference picture information such that the transfer requests are sorted into an order on the basis of at least one of (i) a reference plane to which requested divisions correspond and (ii) which of the first and second fields the requested divisions correspond.

10. The picture processing apparatus according to claim 9, wherein, upon requesting transfer of data from the decoded picture held in said memory during the motion compensation process, said motion compensation circuit controls the order in which transfer requests to the memory are made for the given macro block such that the transfer requests are:
  sorted first into an order on the basis of a reference plane to which requested divisions correspond; and
  sorted second, within each of respective groups of transfer requests corresponding to a same respective reference plane, into an order on the basis of which of the first and second fields the requested divisions correspond.

11. The picture processing apparatus according to claim 9, wherein, upon requesting transfer of data from the decoded picture held in said memory during the motion compensation process, said motion compensation circuit controls the order in which transfer requests to the memory are made for the given macro block such that the transfer requests are:
  sorted first into an order on the basis of which of the first and second fields the requested divisions correspond; and
  sorted second, within each of respective groups of transfer requests corresponding to one of the first and second fields, into an order on the basis of a reference plane to which requested divisions correspond.

12. The picture processing apparatus according to claim 9, wherein, upon requesting transfer of data from the decoded picture held in said memory during the motion compensation process, said motion compensation circuit controls the order in which transfer requests to the memory are made for the given macro block such that:
  the transfer requests are sorted, within each of respective groups of transfer requests corresponding to a same respective sub-macro block, into an order on the basis of which of the first and second fields the requested divisions correspond.

13. A picture processing method comprising the steps of:
  upon at least one of encoding picture data and decoding encoded picture data, holding a first field and a second field of a decoded picture and a plurality of reference planes in a memory; and
  upon requesting transfer of data from the decoded picture held in said memory during a motion compensation process, controlling an order in which transfer requests to the memory are made for the given macro block on the basis of macro block division information and reference picture information such that the transfer requests are sorted into an order on the basis of at least one of (i) a reference plane to which requested divisions of a divided macro block correspond and (ii) which of the first and second fields the requested divisions correspond.

14. The picture processing method according to claim 13, further comprising the step of, upon requesting transfer of data from the decoded picture held in said memory during the motion compensation, controlling an order in which transfer requests to the memory are made for the given macro block such that the transfer requests are:
  sorted first into an order on the basis of a reference plane to which requested divisions correspond; and
  sorted second, within each of respective groups of transfer requests corresponding to a same respective reference plane, into an order on the basis of which of the first and second fields the requested divisions correspond.

15. The picture processing method according to claim 13, further comprising the step of, upon requesting transfer of data from the decoded picture held in said memory during the motion compensation, controlling an order in which transfer requests to the memory are made for the given macro block such that the transfer requests are:
- sorted first into an order on the basis of which of the first and second fields the requested divisions correspond; and
- sorted second, within each of respective groups of transfer requests corresponding to one of the first and second fields, into an order on the basis of a reference plane to which requested divisions correspond.

16. The picture processing method according to claim 13, further comprising the step of, upon requesting transfer of data from the decoded picture held in said memory during the motion compensation, controlling an order in which transfer requests to the memory are made for the given macro block such that:
- the transfer requests are sorted, within each of respective groups of transfer requests corresponding to a same respective sub-macro block, into an order on the basis of which of the first and second fields the requested divisions correspond.

17. A non-transitory computer readable medium having program code stored thereon, the program code being executable by a computer and causing the computer to perform a picture processing procedure comprising the steps of:
- upon at least one of encoding picture data and decoding encoded picture data, holding a first field and a second field of a decoded picture and a plurality of reference planes in a memory; and
- upon requesting transfer of data from the decoded picture held in said memory during a motion compensation process, controlling an order in which transfer requests to the memory are made for the given macro block on the basis of macro block division information and reference picture information such that the transfer requests are sorted into an order on the basis of at least one of (i) a reference plane to which requested divisions of a divided macro block correspond and (ii) which of the first and second fields the requested divisions correspond.

18. The non-transitory computer readable medium according to claim 17, wherein the picture processing procedure further comprising the step of, upon requesting transfer of data from the decoded picture held in said memory during the motion compensation, controlling an order in which transfer requests to the memory are made for the given macro block such that the transfer requests are:
- sorted first into an order on the basis of a reference plane to which requested divisions correspond; and
- sorted second, within each of respective groups of transfer requests corresponding to a same respective reference plane, into an order on the basis of which of the first and second fields the requested divisions correspond.

19. The non-transitory computer readable medium according to claim 17, wherein the picture processing procedure further comprising the step of, upon requesting transfer of data from the decoded picture held in said memory during the motion compensation, controlling an order in which transfer requests to the memory are made for the given macro block such that the transfer requests are:
- sorted first into an order on the basis of which of the first and second fields the requested divisions correspond; and
- sorted second, within each of respective groups of transfer requests corresponding to one of the first and second fields, into an order on the basis of a reference plane to which requested divisions correspond.

20. The non-transitory computer readable medium according to claim 17, wherein the picture processing procedure further comprising the step of, upon requesting transfer of data from the decoded picture held in said memory during the motion compensation, controlling an order in which transfer requests to the memory are made for the given macro block such that:
- the transfer requests are sorted, within each of respective groups of transfer requests corresponding to a same respective sub-macro block, into an order on the basis of which of the first and second fields the requested divisions correspond.

* * * * *